Figure 1:
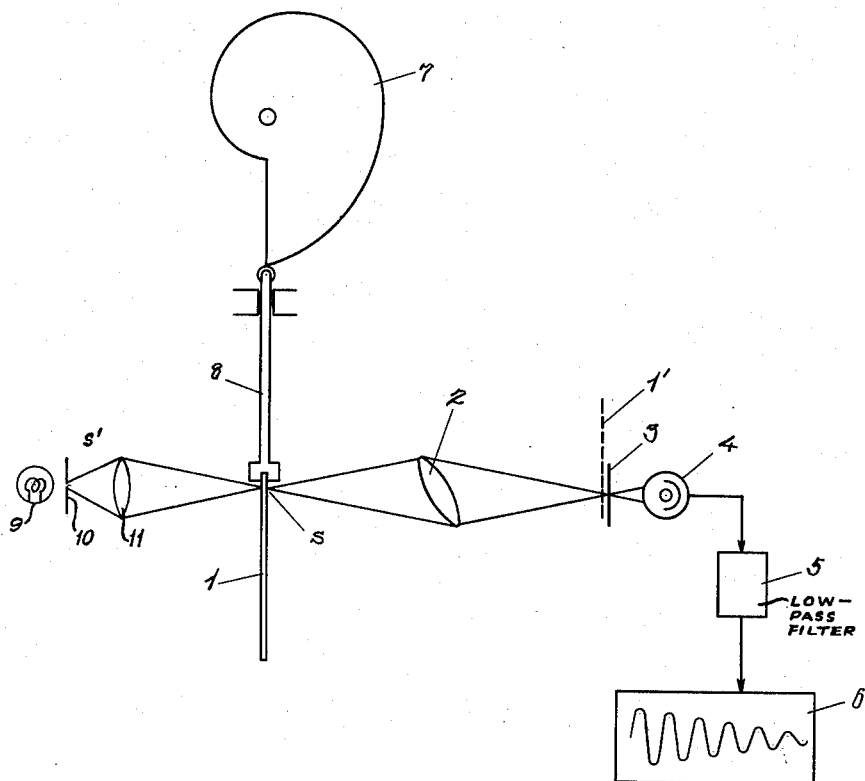

July 6, 1965

KAZUMI MURATA ETAL
METHOD OF AND APPARATUS FOR MEASURING OF
THE CONTRAST-TRANSMISSION FUNCTION
OF AN OPTICAL SYSTEM
Filed March 22, 1960

3,193,690

INVENTORS
Kazumi Murata
and
BY Hiroyuki Matsui attorney

United States Patent Office 3,193,690
Patented July 6, 1965

3,193,690
METHOD OF AND APPARATUS FOR MEASURING OF THE CONTRAST-TRANSMISSION FUNCTION OF AN OPTICAL SYSTEM
Kazumi Murata and Hiroyuki Matui, both of Osaka-fu, Japan, assignors to Agency of Industrial Science and Technology, Tokyo, Japan, a corporation of Japan
Filed Mar. 22, 1960, Ser. No. 16,733
Claims priority, application Japan, Mar. 26, 1959, 34/9,271
4 Claims. (Cl. 250—232)

The present invention relates to a method of, and apparatus for, testing the performance of an optical system, for example, a lens, to determine the contrast transfer function, or as it is sometimes called, the contrast transmission characteristic of the lens or like. The term "contrast transfer function" will be used herein and from it the ratio of the contrast of the image to that of the object may be determined and the image-forming quality of the lens may be deduced.

It is known to conduct such tests by illuminating a moving object consisting of a pattern, test chart, or template, having transparent portions of sinusoidal shape and of differing widths representing different spatial frequencies and defined by an opaque area which covers the rest of the template, and focussing the emergent light, by means of the lens or the like to be tested, on to a narrow slit from which light passes to a photoelectric cell having a recorder of some kind attached, whereby the aforesaid function may be determined, normally as a trace or curve drawn on a chart in the recorder. Alternatively the arrangement is reversed and the slit constitutes the object and the template the image. Such a template is known as a sine wave template. See the Journal of the Society of Motion Picture and Television Engineers, vol. 61, at pages 721 to 730, and Optical Acta, vol. 1, at pages 80 to 89.

Various other kinds of templates are known having transparent portions of other shapes, one kind having a grating of bars and spaces and referred to hereafter as a rectangular wave template.

When a sine wave template is employed it is necessary for the shape of the transparent parts to be accurate and not deformed or distorted in any way, and it is also desirable for the curves to be of considerable amplitude. If the sinusoidal form is in any way distorted, sundry unwanted high frequency effects are produced and the accuracy of the test is impaired. Further, if the amplitude of the sinusoidal shapes is small, the sensitivity of the apparatus is decreased and the results of the tests are unsatisfactory.

The manufacture of a sine wave template of accurate shape and large amplitude is fairly difficult technically. On the other hand, a rectangular wave template is easily manufactured to have an accurate wave form and large amplitude and if such a template is used and all the unwanted harmonics included in the rectangular wave are removed, the results obtained in a test are as good as those obtained from a sine wave template whose wave form corresponds to the fundamental of the rectangular wave. The removal of the high frequency harmonics from the rectangular wave is very difficult by optical means, but if the output resulting from the scanning of the template is converted into an electrical signal, the removal of the unwanted harmonics can easily be effected by a suitable electrical filter. That is to say that if the output from the photoelectric cell is passed through a lowpass filter which rejects all wanted harmonics, the final output is a sine wave corresponding to the fundamental of the rectangular wave.

If then the scanning operation is conducted by scanning successive rectangular transparent portions of different widths but at a constant scanning speed, the time frequency of the rectangular waves would also change successively and this would mean that the passing zones of the low pass filter would need to be changed similarly.

In order to avoid this difficulty the scanning speed, that is the rate at which the template is removed, is changed in accordance with the change in spatial frequency of the template so as to keep the time frequency of the light signal, constituting the input to the photoelectric cell constant.

The filter circuit may then operate under fixed frequency conditions.

It is one object of the present invention to provide a method of testing the performance of an optical system, such as a lens, wherein light is passed through a rectangular wave template and a slit, the lens under test being positioned between template and slit, and wherein the template is removed to provide a scanning motion and at such a rate that the scanning speed is changed in accordance with the changing spatial frequency of the moving template so that an optical output signal having a constant time frequency is obtained, said signal being converted to an electrical signal and filtered to bring it to sinusoidal form.

It is another object of the present invention to provide an apparatus for carrying out the method set forth above, which comprises a rectangular wave template, a lens arranged to receive light passing through said template and directed onto a slit, a photoelectric cell arranged to receive light passing through the slit, means for moving the rectangular wave template in a plane to provide a scanning motion and at such a rate that the scanning speed is changed in accordance with the changing spatial frequency of the moving template, so that the electrical rectangular wave signal output from the photoelectric cell is of constant time frequency, a filter to remove harmonics from the rectangular wave signal and bring it to sinusoidal form and means for displaying the final sinusoidal signal so that its amplitude and phase may be seen.

The display means may be a chart recorder on whose chart the final sinusoidal signal is drawn and the template may be moved by a cam rotating at constant speed and having a contour such that the template is displaced at a rate which is inversely proportional to its changing spatial frequency so that the time frequency of the resulting signal is constant.

Figure 2:
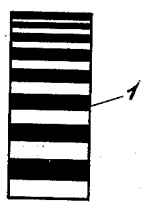

With these and other objects in view which will become apparent in the following detailed description, the present invention will be clearly understood in connection with the accompanying drawings, in which:

FIGURE 1 is a diagrammatic arrangement of one embodiment of the apparatus designed in accordance with the present invention; and FIG. 2 is a diagrammatic front view of a rectangular wave template.

In the drawings, 1 is a rectangular wave template illuminated by incoherent light and arrangements are made for moving the template slowly in the vertical direction in FIG. 1 to bring successive portions in front of a lens 2 whose performance is to be tested. The lens can be tilted, as indicated, so that it can be tested off its optical axis at any angle, as well as on its axis, 3 is a screen having a slit in an image plane 1', the length of the slit being parallel to the stripes on the template, FIG. 2.

The incoherent light originates from a light source 9 through a slot 10 and a condenser 11.

The rectangular wave template, diagrammatically shown in FIG. 2, has a number of transparent and opaque areas whose edges are parallel, so that the areas show as stripes. In practice the template has a large number of these areas arranged in groups, the stripes in each group representing a particular spatial frequency. Thus, in unit length, there is a certain number of stripes, which number indicates the spatial frequency, as used herein. The term spatial frequency is synonymous with line frequency, another expression used in the art.

S is the conjugate point of the lens in the object plane, the template forming the object in this case. At 4 is a photoelectric cell activated by light passing through the slit and the cell output is taken through a low-pass filter circuit 5 to a recorder 6, which is shown as a chart recorder on whose chart a trace is drawn as indicated.

The template 1 is fixed to one end of a rod 8 and the other end of the rod is pressed against a cam 7 which is rotated at a constant speed. The contour of the cam is shaped to move the template so that the number of like stripes which pass through the point S in a given time is constant.

The optical signal due to the light passing through the slit and received by the photoelectric cell includes unwanted harmonics due to the rectangular wave form, but these are removed from the cell output by the filter circuit 5 and only a sine wave corresponding to the fundamental of the rectangular wave passes to the recorder. From the curve drawn by the recorder the amplitude and phase may be read and the image-forming quality of the lens estimated.

With the above apparatus, any error in measurement due to any error in wave form is very small and as a signal of large amplitude is derived from the template, the signal/noise ratio is high and the sensitivity is also high. This enables a lens or like of small aperture ratio to be accurately tested by the apparatus. Also, as the time frequency of the signal is constant, the frequency characteristics of the filter, recorder, and any amplifier used with the electrical apparatus are not effected so all noise can be removed by the filter circuit.

Thus, the present invention provides accurate and sensitive apparatus for determining the contrast transfer function of a lens or like optical system.

It is known to test the resolution of an optical lens by scanning an illuminated test chart by scanning means including the lens to be tested and generating a signal representative of the incident light, to produce a record of some kind and in one case of this kind the test chart pattern is in the form of elongated zones extending generally in the direction of scanning, contiguous zones being substantially opaque and transparent and the widths of the zones transverse their length varying continuously in the direction of scanning the test chart being mounted on the periphery of a rotating drum. In a modified form of the same arrangement the test chart pattern consists of contiguous parallel bars, opaque and transparent, arranged in sets lying end to end with the width of the bars varying from set to set.

In another scanning arrangement, described in volume 61 of the Journal of the Society of Motion Picture and Television Engineers, on pages 721 to 730, a test chart is on the periphery of a uniformly rotating drum and consists of a plurality of groups of spaced light transmitting bars, each group representing a different grade of detail, the lengths of the bars being parallel with the axis of rotation of the drum.

While we have disclosed one embodiment of the present invention, it is to be understood that this embodiment is given by example only and not in a limiting sense, the scope of the present invention being determined by the objects and the claims.

What we claim is:
1. A method of measuring the performance of an optical system, particularly as a lens, with rectangular wave template, comprising the steps of
  passing light through a rectangular wave template and a slit, said lens being positioned between said template and said slit,
  moving said template to provide a scanning motion and at such a rate that the scanning speed is changed in accordance with the changing spatial frequency of said moving template, thereby obtaining an optical output signal having a constant time frequency,
  converting said optical output signal to an electrical signal, and
  filtering said electrical signal to bring it to sinusoidal form.

2. An apparatus for measuring the performance of an optical system, particularly as a lens, comprising
  a rectangular wave template,
  a member defining a slit,
  a lens positioned between said template and said slit and receiving light passing through said template and directed onto said slit,
  a photoelectric cell receiving light passing through said slit,
  means for moving said rectangular wave template in a plane to provide a scanning motion and at such a rate that the scanning speed is changed in response to the changing spatial frequency of said moving template, whereby the electrical rectangular wave signal output from said photoelectric cell is of constant time frequency,
  a filter removing harmonics from said rectangular wave signal and transforming the latter to sinusoidal form, and
  means for displaying the final sinusoidal signal to view its amplitude and phase.

3. The apparatus, as set forth in claim 2, wherein said displaying means comprises a recorder including a chart whereon said signal is drawn in sinusoidal form.

4. The apparatus, as set forth in claim 2, wherein said means for moving said template comprises a cam rotating at constant speed and having a contour such that said template is displaced at a rate which is inversely proportional to its changing spatial frequency, whereby the time frequency of the resulting signal is constant.

References Cited by the Examiner
UNITED STATES PATENTS

| | | | |
|---|---|---|---|
| 2,243,600 | 5/41 | Hulst | 250—232 X |
| 2,439,392 | 4/48 | Jones | 250—233 |
| 2,897,722 | 8/59 | Gunter et al. | 88—56 |
| 2,958,135 | 11/60 | Lakin | 250—232 X |
| 3,008,577 | 11/61 | Miles | 88—56 X |

FOREIGN PATENTS

| | | |
|---|---|---|
| 797,513 | 7/58 | Great Britain. |
| 821,599 | 10/59 | Great Britain. |

RALPH G. NILSON, *Primary Examiner.*

RICHARD M. WOOD, WALTER STOLWEIN,
*Examiners.*